US010443215B2

(12) United States Patent
Sato et al.

(10) Patent No.: US 10,443,215 B2
(45) Date of Patent: Oct. 15, 2019

(54) CONSTRUCTION MACHINE MANAGEMENT SYSTEM

(71) Applicant: HITACHI CONSTRUCTION MACHINERY CO., LTD., Tokyo (JP)

(72) Inventors: Shinya Sato, Tokyo (JP); Kentarou Itoga, Tsuchiura (JP); Masatoshi Hoshino, Tsuchiura (JP); Kouji Ishikawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 140 days.

(21) Appl. No.: 15/512,146

(22) PCT Filed: Nov. 24, 2015

(86) PCT No.: PCT/JP2015/082911
§ 371 (c)(1),
(2) Date: Mar. 17, 2017

(87) PCT Pub. No.: WO2016/088604
PCT Pub. Date: Jun. 9, 2016

(65) Prior Publication Data
US 2017/0292250 A1 Oct. 12, 2017

(30) Foreign Application Priority Data

Dec. 5, 2014 (JP) .................................. 2014-246571

(51) Int. Cl.
E02F 9/26 (2006.01)
F02D 45/00 (2006.01)
(Continued)

(52) U.S. Cl.
CPC ............ E02F 9/267 (2013.01); E02F 9/2066 (2013.01); E02F 9/26 (2013.01); E02F 9/268 (2013.01);
(Continued)

(58) Field of Classification Search
CPC ......... E02F 9/267; E02F 9/268; E02F 9/2066; E02F 9/26; F02D 41/22; F02D 29/00;
(Continued)

(56) References Cited

U.S. PATENT DOCUMENTS

2002/0059320 A1* 5/2002 Tamaru .................. E01C 19/00
2008/0040152 A1* 2/2008 Vian .................. G05B 23/0221
705/2
(Continued)

FOREIGN PATENT DOCUMENTS

DE 101 51 942 A1 12/2002
JP 2002-228554 A 8/2002
(Continued)

OTHER PUBLICATIONS

Korean Office Action received in corresponding Korean Application No. 10-2017-7004141 dated Apr. 11, 2018.
(Continued)

Primary Examiner — Alan D Hutchinson
(74) Attorney, Agent, or Firm — Mattingly & Malur, PC

(57) ABSTRACT

A construction machine management system in which a failure analysis or a failure-omen diagnosis of a machine body can be performed with a high degree accuracy and at a low cost is provided. In a machine body group of construction machines including at least one representative machine body having an engine control unit that detects a cumulative stress value of a diesel engine of the construction machine and a crankcase pressure sensor that detects a crankcase pressure, and at least one general machine body that has an engine control unit but does not have a crankcase pressure sensor, a center server performs a diagnosis of an omen of a failure state regarding the crankcase pressure of the general machine body based on correlation information between the cumulative stress value and the crankcase
(Continued)

pressure obtained from the representative machine body and the cumulative stress value of the general machine body.

8 Claims, 15 Drawing Sheets

(51) Int. Cl.
    *F02D 29/00*     (2006.01)
    *F02D 29/02*     (2006.01)
    *E02F 9/20*     (2006.01)
    *F02D 41/22*     (2006.01)
    *G07C 5/08*     (2006.01)

(52) U.S. Cl.
    CPC .............. *F02D 29/00* (2013.01); *F02D 29/02* (2013.01); *F02D 41/22* (2013.01); *F02D 45/00* (2013.01); *G07C 5/0808* (2013.01); *G07C 5/0816* (2013.01); *Y02T 10/40* (2013.01)

(58) Field of Classification Search
    CPC ....... F02D 45/00; F02D 29/02; G07C 5/0816; G07C 5/0808
    See application file for complete search history.

(56) References Cited

U.S. PATENT DOCUMENTS

| 2009/0235725 | A1 | 9/2009 | McLain et al. |
| 2014/0358357 | A1 | 12/2014 | Jones et al. |

FOREIGN PATENT DOCUMENTS

| JP | 2004-353618 A | 12/2004 |
| JP | 2005-163754 A | 6/2005 |
| JP | 2007-329664 A | 12/2007 |
| JP | 2008-196428 | 8/2008 |
| JP | 2009-203882 A | 9/2009 |
| JP | 2011-52435 A | 3/2011 |
| JP | 2012-177319 A | 9/2012 |

OTHER PUBLICATIONS

International Preliminary Report on Patentability received in corresponding International Application No. PCT/JP2015/082911 dated Jun. 15, 2017.
Extended European Search Report received in corresponding European Application No. 15865507.6 dated Jun. 18, 2018.
International Search Report of PCT/JP2015/082911 dated Feb. 16, 2016.

* cited by examiner

RELATIONSHIP CURVE OBTAINED FROM
REPRESENTATIVE MACHINE BODY

CONSTRUCTION MACHINE MANAGEMENT SYSTEM

TECHNICAL FIELD

The present invention relates to a management system that performs such processes as a failure analysis and a failure-omen diagnosis of a construction machine.

BACKGROUND ART

In a construction machine such as a hydraulic excavator, since the load factor is high in comparison with such a vehicle as a truck, the possibility that an engine or the like may fail is relatively high. On the other hand, if such a construction machine suffers from a fatal failure, then since expensive repair costs occur and there is such a circumference that there is no choice but to drastically lower the occupancy rate within a repair period, it is demanded to make it possible to handle the maintenance at an initial stage of a failure by performing a failure analysis, a diagnosis of an omen, or the like thereby to prevent a fatal failure of the machine body.

For example, as a technology relating to a failure diagnosis of an engine used for a construction machine, Patent Document 1 discloses a failure diagnosis apparatus for an internal combustion engine in which a cylinder internal pressure sensor is installed in an engine that is a prime mover to detect a failure of a fuel injection valve.

Further, as another technology relating to a failure diagnosis of an engine, Patent Document 2 for example discloses a machine body diagnosis apparatus in which frequency distribution information representative of a relationship between the magnitude and the appearance frequency of a signal relating to engine output power is generated and accumulated and a decrease of engine output power is detected on the basis of the frequency distribution information.

PRIOR ART DOCUMENT

Patent Document

Patent Document 1: JP-2012-177319-A
Patent Document 2: JP-2008-196428-A

SUMMARY OF THE INVENTION

Problems to be Solved by the Invention

However, the conventional technologies described above have such problems as described below.

In particular, to separately install a measuring sensor for collecting information to be used for a failure diagnosis of an engine like, for example, a cylinder internal pressure sensor in addition to various sensors installed normally for performing operation control of the machine body of a construction machine as in the case of Patent Document 1 described above gives rise to a subject that it leads to increase in the cost of the machine body.

Meanwhile, a system that uses an information network as in the case of Patent Document 2 described above has a subject in that, since there is a limitation to the communication capacity between a server that accumulates information and the machine body, where sensors having a great information amount are attached to individual machine bodies, sufficient information from all machine bodies cannot be fetched.

The present invention has been made in view of the above, and it is an object of the present invention to provide a construction machine management system in which a failure analysis or a failure-omen diagnosis of a machine body can be performed with a high degree accuracy and at a low cost.

Means for Solving the Problems

In order to attain the object described above, according to the present invention, a construction machine management system that manages a state of each of machine bodies configuring a machine body group of construction machines, the machine body group including at least one first machine body having a first information detection device that detects first information relating to the machine body of the construction machine and a second information detection device that detects second information relating to the machine body of the construction machine, and at least one second machine body that has the first information detection device but does not have the second information detection device, the construction machine management system includes a machine body state diagnosis device that performs a diagnosis of an omen of a failure state regarding the second information of the second machine body based on correlation information between the first information and the second information obtained from the first machine body and the first information of the second machine body.

Effect of the Invention

A failure analysis or a failure-omen diagnosis of the machine body of the construction machine can be performed with a high degree of accuracy and at a low cost.

MODE FOR CARRYING OUT THE INVENTION

In the following, embodiments of the present invention are described with reference to the drawings.

First Embodiment

A first embodiment of the present invention is described with reference to FIGS. 1 to 11.

Figure 1:
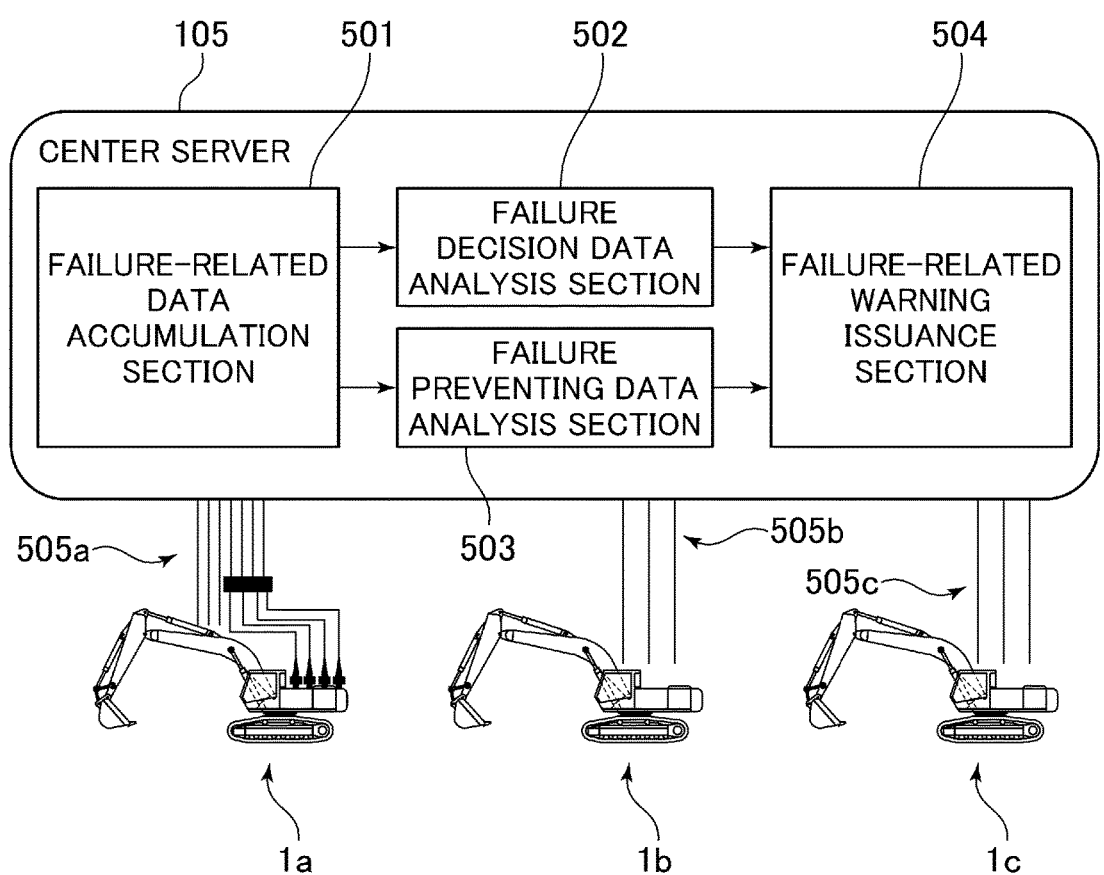
FIG. 1 is a diagram schematically showing a general configuration of a construction machine management system according to a first embodiment.

FIG. 1 is a diagram schematically showing a general configuration of a construction machine management system according to the first embodiment of the present invention.

Referring to FIG. 1, the construction machine management system includes a center server 105 as a machine body state diagnosis apparatus that collects information of construction machines obtained from a plurality of construction machines 1a to 1c (for example, hydraulic excavators hereinafter described in detail) through communication paths 505a to 505c of an information network, performs information processing to manage the entire construction machine group (in other words, machine body group of the construction machines) and to perform a failure analysis, a failure-omen diagnosis and so forth on the basis of the information relating to the machine bodies of the construction machines.

The center server 105 has a failure-related data accumulation section 501 for accumulating failure-analyzed data, a failure decision data analysis section 502 for performing a failure analysis process, a failure preventing data analysis section 503 for performing a diagnosis of an omen, and a failure-related warning issuance section 504, and processing for a failure analysis and a failure-omen diagnosis is performed by these sections on the basis of information of the machine bodies collected from the construction machines.

The present embodiment described below is directed to a case in which a hydraulic excavator that uses a diesel engine as a prime mover is indicated as an example of a construction machine and processing for a failure analysis and a failure-omen diagnosis is performed on the basis of various types of information of the diesel engines collected as information of a machine body.

Hereunder, a basic way of thinking of the construction machine management system in the present embodiment is described.

Figure 2:
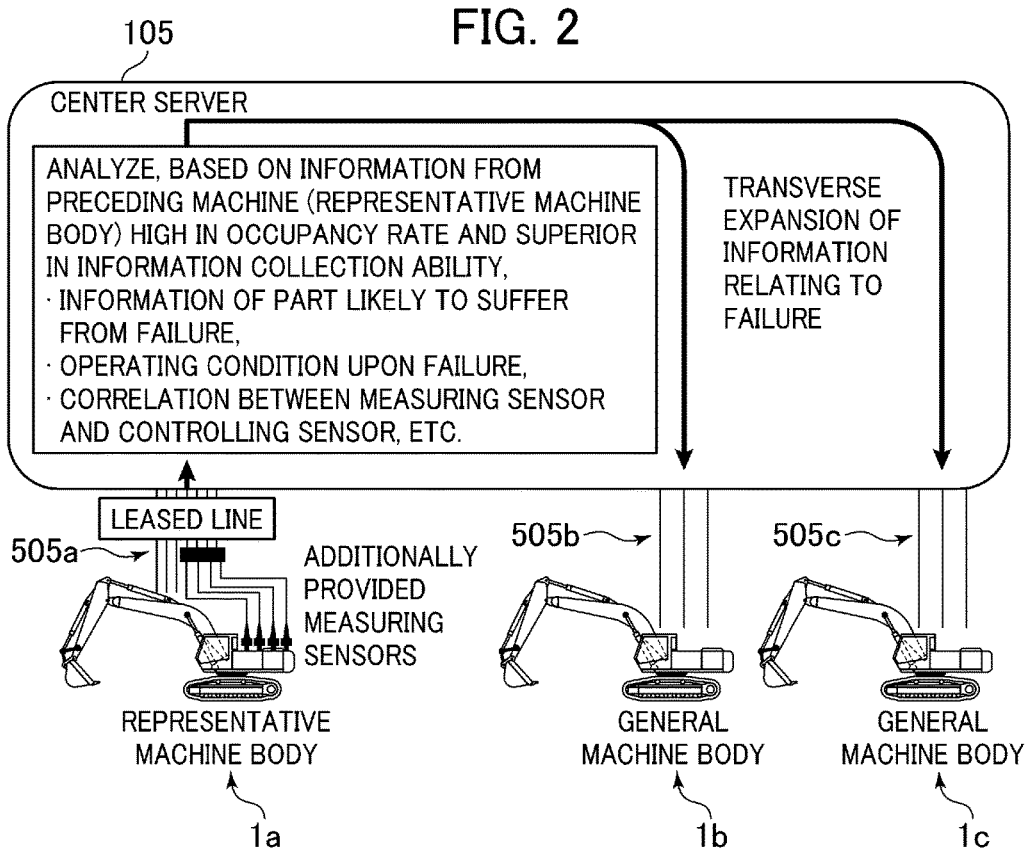
FIG. 2 is a diagram illustrating a basic way of thinking of the construction machine management system according to the first embodiment and is a diagram showing a general configuration of the management system in which machine bodies of construction machines and a center server are coupled to each other by an information network.
Figure 3:
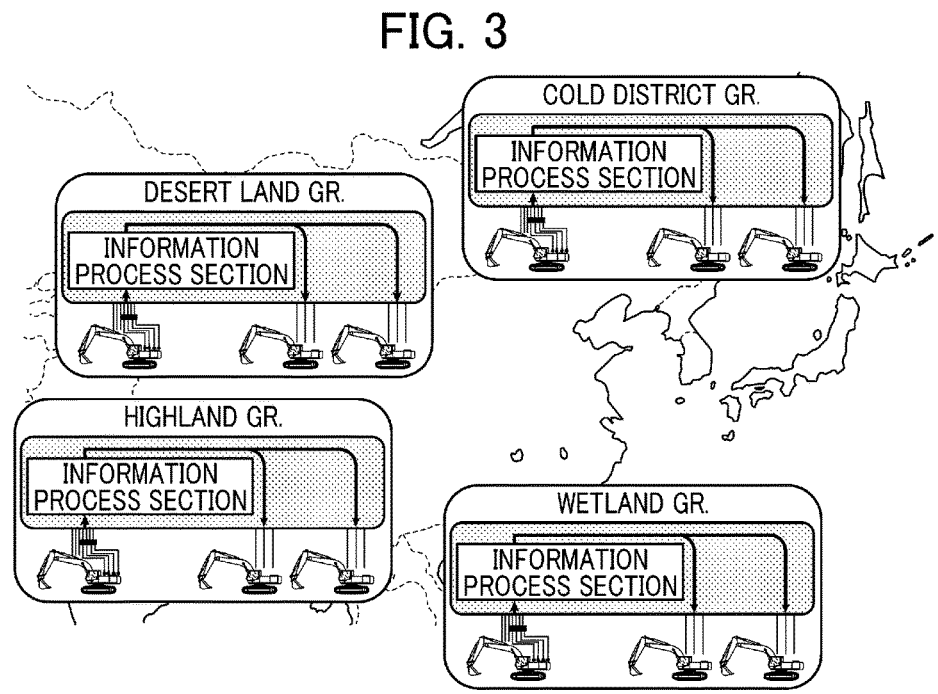
FIG. 3 is a diagram illustrating a basic way of thinking of the construction machine management system according to the first embodiment and is a diagram illustrating a way of thinking when a construction machine group including a plurality of construction machines is formed.

FIGS. 2 and 3 are diagrams illustrating a basic way of thinking of the construction machine management system according to the present embodiment, and FIG. 2 is a diagram showing a general configuration of the management system in which the machine bodies of the construction machines and the center server are coupled to each other by an information network and FIG. 3 is a diagram illustrating a way of thinking when a construction machine group including a plurality of construction machines is formed.

Referring to FIG. 2, a plurality of (here, exemplifying a case in which the number is three) construction machines 1a to 1c connected to the same center server 105 by the information network are of the same machine type, and a representative machine body or a general machine body is allotted to each of the construction machines 1a to 1c.

The representative machine body is a machine body that is estimated to be high in occupancy rate or work load (in the present embodiment, the construction machine 1a) in the construction machine group (machine body group), and is a machine body that is placed into an operating state preceding the operation of any other machine body (general machine body: in the present embodiments, the construction machines 1b and 1c) of the same machine body group, and is set empirically in advance from within the machine body group. The representative machine body (construction machine 1a) includes, in order to acquire various kinds of information of the machine body, separately from controlling sensors installed for operation control in both of the representative machine body and the general machine bodies (construction machines 1b and 1c), measuring sensors provided additionally in comparison with the general machine bodies, and further includes, for connection to the center server 105, dedicated circuits commensurate with the increase in the information amount. It is to be noted that the number of each of the representative machine body and the general machine body may be one or more, and a plurality of machine bodies may be set for each of them.

The representative machine body applies detailed information relating to a failure (for example, information relating to parts with regard to which it is inferred that it is likely to suffer from a failure, information relating to operating conditions when various failures occur, information relating to a correlation between measuring sensor values and controlling sensor values and so forth) obtained by the measuring sensors within a working period of the representative machine body preceding that of the general machine bodies, to a failure analysis or a failure-omen diagnosis of the other machine bodies (other representative machine body or bodies and general machine bodies) connecting to the same information network, by collecting such information into the center server 105 through the information network and analyzing the information.

Referring to FIG. 3, in order to increase the validity when information obtained from a representative machine body in each machine body group is expanded to other machine bodies (other representative machine bodies and general machine bodies) as much as possible, a machine body group is configured from machine bodies that are similar in environment of the representative machine bodies and the other machine bodies (general machine bodies).

As an example of a configuration of machine body groups, grouping for each environmental condition may be applicable, and a machine body group may be configured for each of environmental conditions of, for example, a cold district, a desert land, a highland and a wetland. Meanwhile, as another configuration example of a machine body group, grouping for each solid quality used as an index taking notice of the engine load may be applicable, and a machine body group may be configured for each working soil of, for example, a landslide zone, a soft rock zone or a hard rock zone. Furthermore, as different grouping using an index taking notice of an engine load, grouping for each work contents may be applicable, and a machine body group may be configured for each work contents such as a work for excavation or for disassembly. Further, a plurality of indices listed above may be combined in a matrix to achieve finer grouping thereby to increase the similarly of operating conditions of machine body groups.

Figure 4:
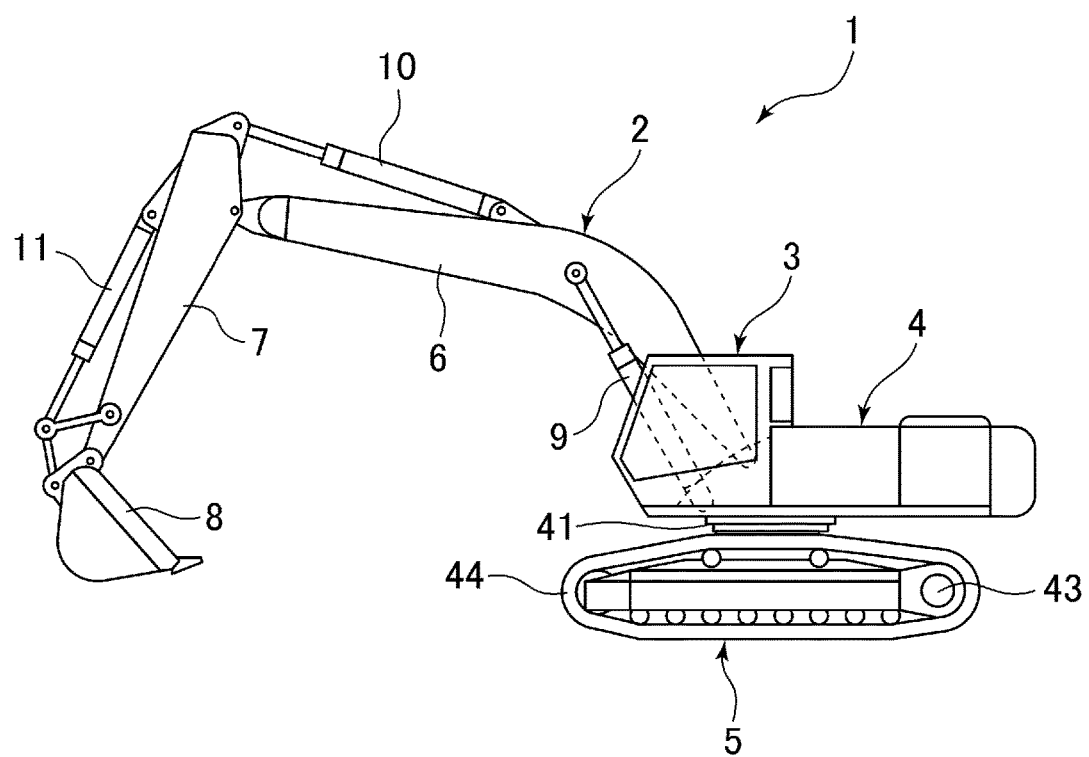
FIG. 4 is a diagram showing an appearance of a hydraulic excavator indicated as an example of a construction machine according to the first embodiment.

FIG. 4 is a diagram showing an appearance of a hydraulic excavator indicated as an example of a construction machine according to the present embodiment. Meanwhile, FIG. 5 is a diagram schematically showing a configuration relating to a hydraulic drive system of the hydraulic excavator.

Figure 5:
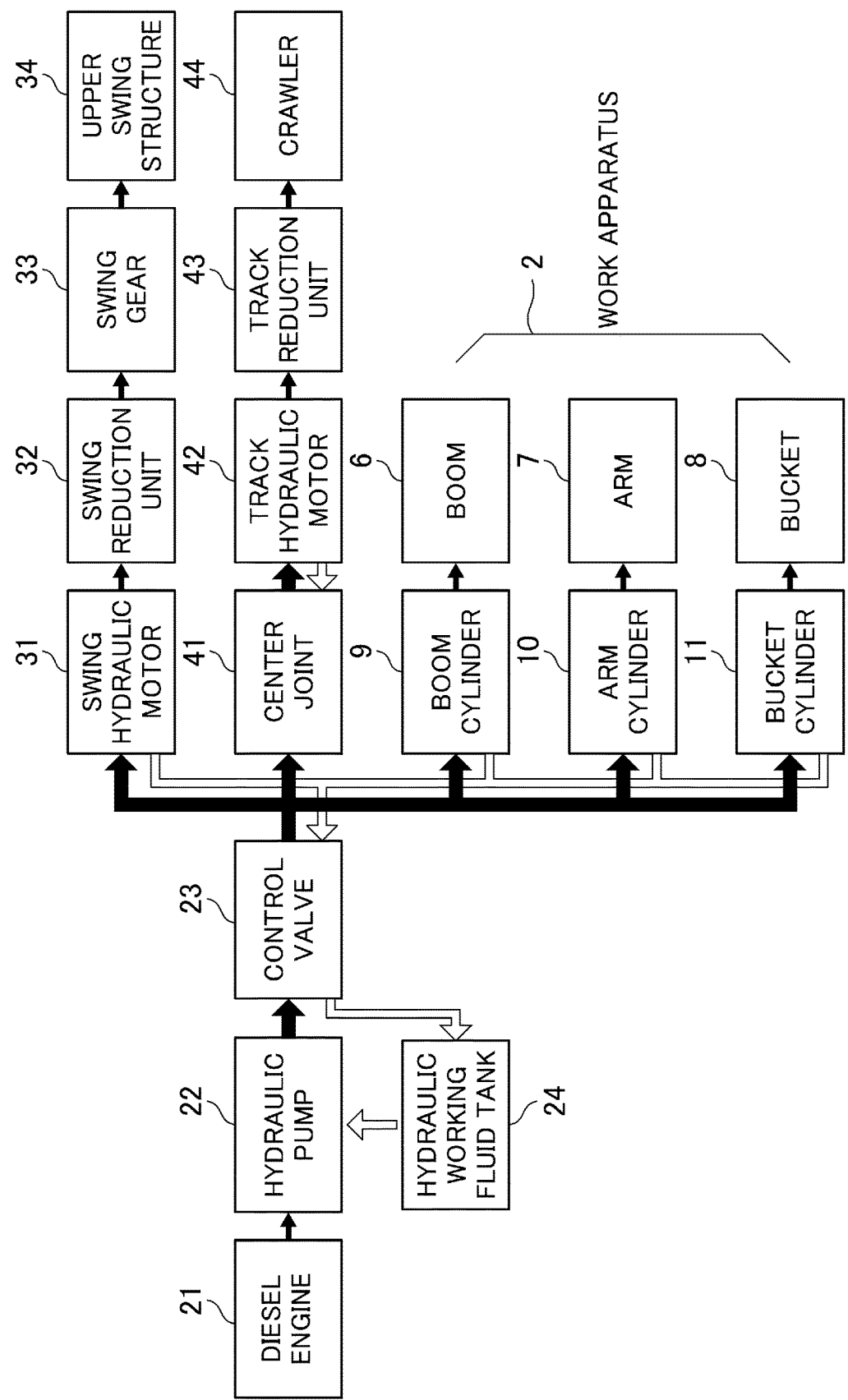
FIG. 5 is a diagram schematically showing a configuration relating to a hydraulic drive system of a hydraulic excavator according to the first embodiment.

Referring to FIGS. 4 and 5, the hydraulic excavator 1 that is a construction machine is generally configured from a lower track structure 5 of the crawler type, an upper swing structure 4 provided for swinging movement with respect to the lower track structure 5, and a work device 2 including excavation working means and so forth.

On the upper swing structure 4, a cabin 3 in which an operation device for the hydraulic excavator 1, a driving seat on which an operator is to be seated and so forth are disposed, a diesel engine 21, a hydraulic pump 22, a swing hydraulic motor 31 and so forth as prime movers of the hydraulic excavator 1 that is a construction machine are provided. In the inside of the cabin 3, a monitor unit 103 (refer to FIG. 6) as a display device for displaying various kinds of information such as meters relating to the hydraulic excavator 1, operation devices (not shown) for performing various operations and so forth are provided.

The diesel engine 21 and the hydraulic pump 22 are mechanically connected to each other, and the hydraulic pump 22 driven by the diesel engine 21 compresses hydraulic working fluid in a working fluid tank 24 into pressurized fluid and supplies the pressurized fluid to a control valve 23. The control valve 23 controls and distributes the pressurized fluid necessary for operation of the lower track structure 5, upper swing structure 4 and work device 2 on the basis of an operation instruction from the operator and returns unnecessary pressurized fluid to the working fluid tank 24. The swing hydraulic motor 31 is driven by the pressurized fluid supplied thereto through the control valve 23 to drive the upper swing structure 4 to swing in the rightward direction or the leftward direction with respect to the lower track structure 5 through a swing reduction gear 32 and a swing gear 33.

Left and right track hydraulic motors 42 (only one is shown) are disposed on the lower track structure 5, and the track hydraulic motors 42 and a track reduction gear 43 are drive by the pressurized fluid sent from the hydraulic pump 22 through the control valve 23 and a center joint 41 to drive a crawler 44 to rotate such that the hydraulic excavator 1 travels forwardly or rearwardly.

The work device 2 is configured from a boom 6, an arm 7 and a bucket 8. The boom 6 is moved upwardly and downwardly by a boom cylinder 9, and the arm 7 is operated to the damp side (opening side) or the crowd side (rusting side) by an arm cylinder 10. Further, the bucket 8 is operated to the damp side or the crowd side by a bucket cylinder 11. The boom cylinder 9, arm cylinder 10 and bucket cylinder 11 are driven by the pressurized fluid supplied through the control valve 23.

Figure 6:
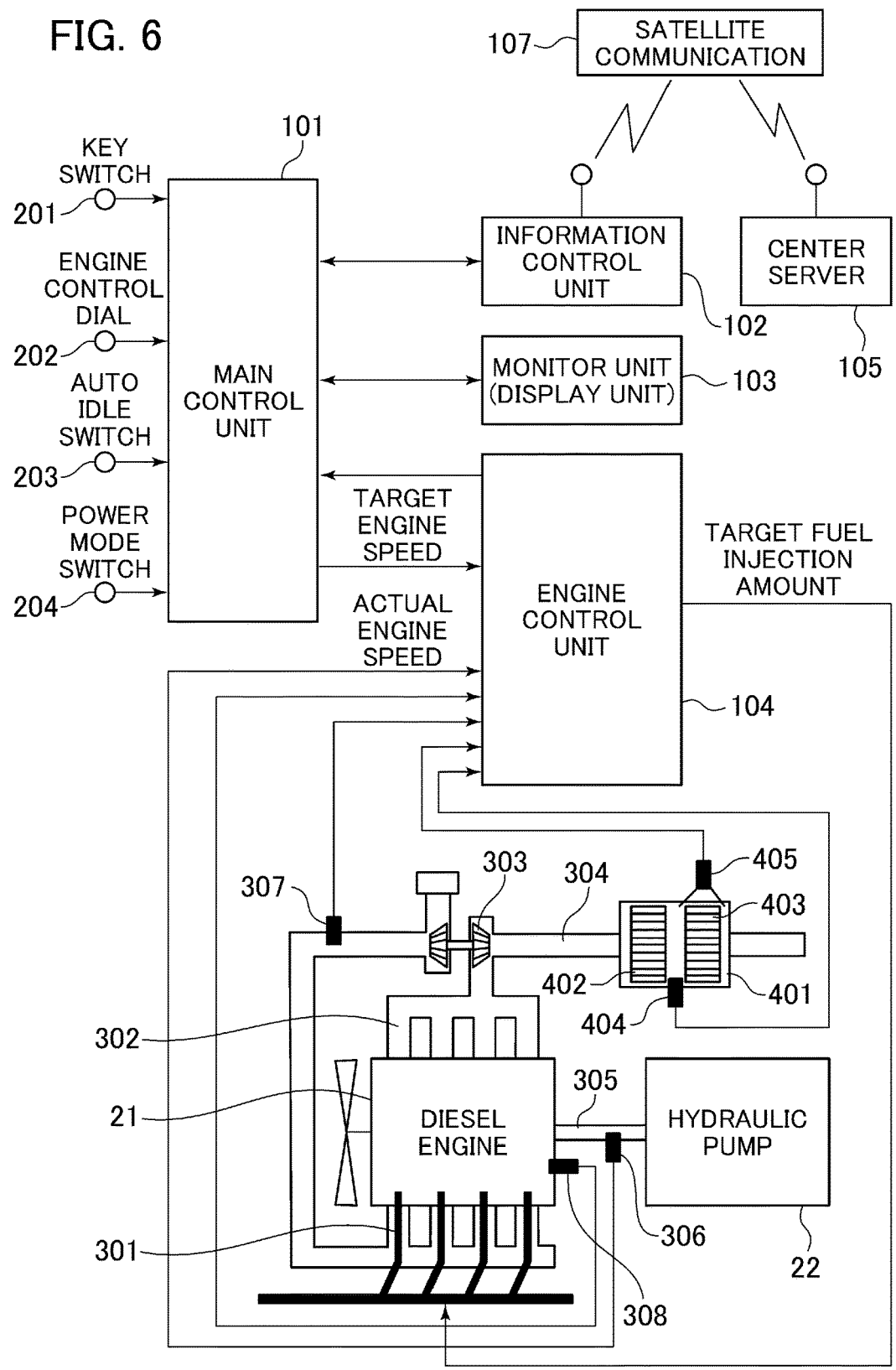
FIG. 6 is a diagram schematically showing a diesel engine of the hydraulic excavator according to the first embodiment together with related components extracted from the hydraulic excavator.

FIG. 6 is a diagram schematically showing the diesel engine of the hydraulic excavator according to the present embodiment together with related components extracted from the diesel engine.

Referring to FIG. 6, the diesel engine 21 of the hydraulic excavator 1 is directly coupled to the hydraulic pump 22 through an output power shaft 305 such that the hydraulic pump 22 is driven by the diesel engine 21.

The diesel engine 21 includes a fuel injection system 301 of the electronic control type, a turbocharger 303 driven by exhaust gas exhausted through an exhaust manifold 302, and a diesel particulate filter (DPF) device 401 that is a kind of exhaust gas purification device. The DPF device 401 is installed in in an exhaust pipe 304 connecting to the exhaust manifold 302, and is configured from oxidation catalyst 402 disposed on the upstream side and a particle matter (PM) collection filter 403 disposed on the downstream side of the oxidation catalyst 402 for collecting a PM included in exhaust gas.

To an engine control unit 104, a target engine speed transmitted from a main control unit 101, an actual engine speed detected by a rotational speed sensor 306 provided on the output power shaft 305, a supercharging pressure detected by a supercharging pressure sensor 307 provided at a supplying portion of exhaust gas to the turbocharger 303, a crankcase pressure detected by a crankcase pressure sensor 308 provided on the diesel engine 21, an exhaust gas temperature detected by an exhaust gas temperature sensor 404 provided on the DPF device 401, and a DPF front-rear pressure difference detected by a DPF pressure difference sensor 405 are inputted. The engine control unit 104 transmits a target fuel injection amount to the fuel injection system 301 on the basis of a difference between a target engine speed transmitted from the main control unit 101 and an actual engine speed transmitted from the rotational speed sensor 306 to control the engine speed.

It is to be noted that the crankcase pressure sensor 308 as an information detection device for detecting a crankcase pressure as information relating to the machine body of the construction machine is newly and additionally provided only on the representative machine body but is not provided on the general machine bodies.

The main control unit 101 controls operation of the entire hydraulic excavator 1 and receives, as inputs thereto, a signal from a key switch 201 that relates to starting and stopping of the engine, a signal from an engine control dial 202 that designates a speed of the diesel engine 21, a signal from an auto idle switch 203 that optimizes the idle speed of the diesel engine 21, a signal from a power mode switch 204 that adjusts the output power of the diesel engine 21 and so forth are inputted. The main control unit 101 arithmetically operates a target engine speed on the basis of the information inputted thereto and transmits the target engine speed to the engine control unit 104.

Further, to the main control unit 101, the monitor unit 103 as a display device for proving a hydraulic pressure or information relating to the engine to the operator, an information control unit 102 for performing exchange of information relating to the machine body of the hydraulic excavator 1 to and from the outside and so forth are connected. The information control unit 102 is mutually communicatable with the center server 105 through satellite communication 107 as a communication path, and transmits information of the machine body of the hydraulic excavator 1 to the center server 105 and receives infrastructure information transmitted from the center server 105 and reference information, instruction values and so forth to the machine bodies that configure the construction machine group.

Hereunder, processes for a failure analysis and a failure-omen diagnosis in the construction machine management system of the present embodiment are described in detail. In the description of the present embodiment, a case is exemplified in which, as a particular case, a failure analysis and a failure-omen diagnosis relating to the airtightness of the diesel engine are performed.

The construction machine management system according to the present embodiment manages a state of each of machine bodies in a machine body group of construction machines, the machine body group including at least one representative machine body (first machine body) having a cumulative stress detection device (first information detection device configured from various sensors, an engine control unit, an hour meter and so forth hereinafter described) that detects cumulative stress (first information) relating to the machine body of the construction machine and a crankcase pressure sensor 308 (second information detection device) that detects a crankcase pressure (second information), and at least one general machine body (second machine body) that has a cumulative stress detection device (first information detection device) but does not have the crankcase pressure sensor 308 (second information detection device). The construction machine management system according to the present embodiment further performs, by a center server 105 (machine body state diagnosis apparatus), a diagnosis of an omen of a failure state regarding the crankcase pressure (second information) of the general machine body (second machine body) on the basis of correlation information between the cumulative stress (first information) obtained from the representative machine body (first machine body) and the crankcase pressure (second information) and the cumulative stress (first information) of the general machine body (second machine body).

Figure 7:
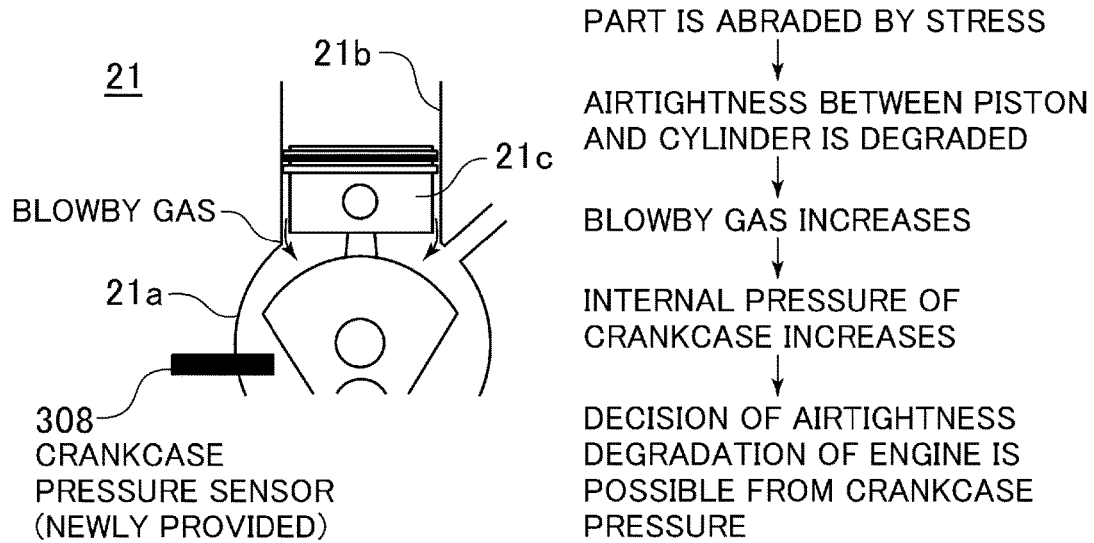
FIG. 7 is a diagram schematically illustrating a diagnosis principle of airtightness degradation in an airtightness degradation diagnosis process that is a failure-omen diagnosis relating to the airtightness of a diesel engine.
Figure 8:
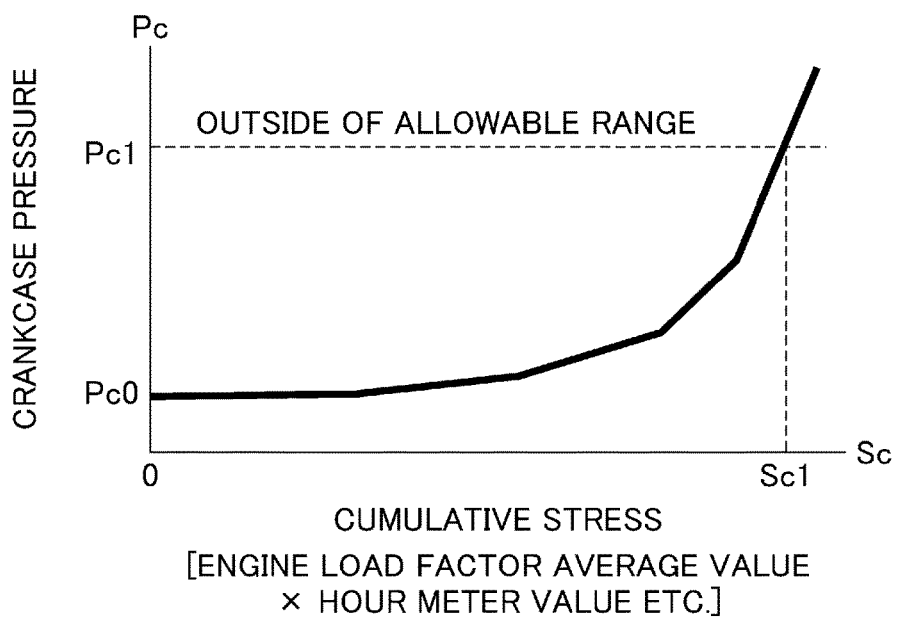
FIG. 8 is a diagram illustrating a correlation of parameters relating to the airtightness degradation diagnosis process.
Figure 9:
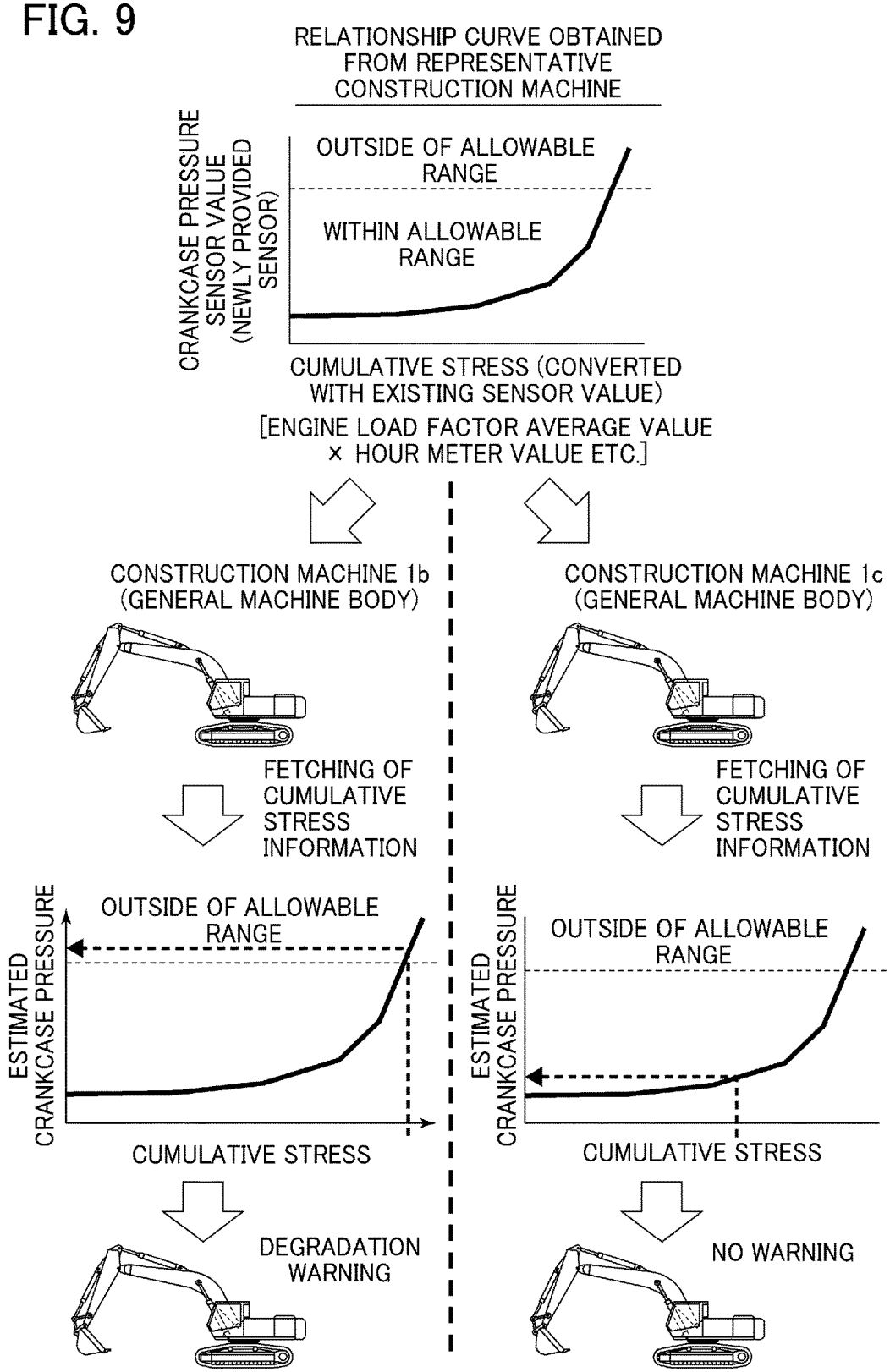
FIG. 9 is a diagram schematically illustrating a decision method of airtightness degradation in the airtightness degradation diagnosis process.

FIG. 7 is a diagram schematically illustrating a diagnosis principle of airtightness degradation in an airtightness degradation diagnosis process that is a failure-omen diagnosis regarding the airtightness of a diesel engine, FIG. 8 is a diagram illustrating a correlation between parameters relating to an airtightness degradation diagnosis process, and FIG. 9 is a diagram schematically illustrating a decision method of airtightness degradation in an airtightness degradation diagnosis process.

In FIG. 7, a crankcase 21a of the diesel engine 21 and peripheral components of the same are shown schematically. In the diesel engine 21, for example, by abrasion of parts by use for a long term and so forth, the clearance between a cylinder 21b and a piston 21c increases, and the airtightness of the inside of the engine (namely, a combustion chamber of the cylinder 21b) and blowby gas (unburned gas that flows through from the combustion chamber to the crankcase 21a) increases. Therefore, when the airtightness of the diesel engine 21 degrades, the internal pressure of the crankcase 21a increases in comparison with that in a normal state. In short, if the internal pressure of the crankcase 21a is monitored by the crankcase pressure sensor 308, then a diagnosis of an omen can be performed regarding the degree of airtightness degradation of the engine from the pressure values.

In FIG. 8, a relationship between the crankcase pressure and the cumulative stress in the diesel engine of the representative machine body is shown, and the axis of ordinate indicates the crankcase pressure and the axis of abscissa indicates the cumulative stress.

As shown in FIG. 8, when the cumulative stress S is 0, the crankcase pressure P indicates an initial value P0, and as the cumulative stress S increases, also the crankcase pressure P increases. If the cumulative stress S exceeds a certain level, then the crankcase pressure P increases suddenly, and if the cumulative stress S becomes a certain value S1, then the crankcase pressure P reaches an allowable limit value P1 (crankcase pressure allowable limit value) as a normal value of the crankcase pressure P. Then, if the cumulative stress S exceeds the value S1, then the crankcase pressure P reaches the outside of the allowable range.

As described hereinabove, the crankcase pressure that has a correlation to airtightness degradation of the diesel engine 21 is detected by the crankcase pressure sensor 308 installed on the diesel engine 21 of the representative machine body. Meanwhile, for the cumulative stress, an index is given by a value obtained by multiplying an average value of an engine load factor arithmetically operated by the engine control unit or the like on the basis of detection values of various sensors provided on the representative machine body and the general machine body and an hour meter value representative of a cumulative value of an operating time period of the construction machine. The correlation between the crankcase pressure and the cumulative stress is acquired by storing, while plotting a relationship between the cumulative stress and the crankcase pressure within a preceding operating period of the representative machine body, the information of the relationship into a database in the center server 105. By using the correlation between the crankcase pressure and the cumulative stress, a crankcase pressure can be estimated on the basis of a cumulative stress value that can be arithmetically operated by the engine control unit 104 from the detection values of the various sensors of the general machine body, and eventually it is possible to estimate a degree of airtightness degradation of the diesel engine 21 to perform a diagnosis of an omen of a failure state.

As shown in FIG. 9, in a decision of airtightness degradation in an airtightness degradation diagnosis process, information relating to an airtightness degradation diagnosis (correlation between the crankcase pressure and the cumulative stress) obtained from the representative machine body (refer to the construction machine 1a) is expanded to the other general machine bodies (construction machines 1b and 1c). The correlation between the crankcase pressure and the cumulative stress acquired from the representative machine body is applied to the other general machine bodies through the center server 105 to carry out an airtightness degradation diagnosis process of the diesel engine 21.

For example, when an airtightness degradation diagnosis process of a certain general machine body (construction machine 1b) is carried out, information relating to the cumulative stress of the construction machine 1b is fetched into the center server 105, and an estimated value of the crankcase pressure is arithmetically operated on the basis of the relationship between the cumulative stress and the crankcase pressure. If it is decided as a result of the arithmetic operation that the estimated crankcase pressure is outside the allowable range, then a warning (airtightness degradation warning) regarding airtightness degradation is issued from the center server 105 to the construction machine 1b such that the warning is displayed on the monitor unit (display device) 103 or the like to urge the operator to inspect the machine body.

Also when an airtightness degradation diagnosis process of another general machine body (construction machine 1c) is performed, information regarding the cumulative stress of the construction machine 1c is fetched into the center server 105, and an estimated value of the crankcase pressure is arithmetically operated on the basis of the relationship between the cumulative stress and the crankcase pressure similarly. If it is decided as a result of the arithmetic operation that the estimated crankcase pressure is within the allowable range, then the center server 105 makes no action and ends the procedure of the airtightness degradation diagnosis process.

Now, an airtightness degradation diagnosis process in the present embodiment is described.

Figure 10:
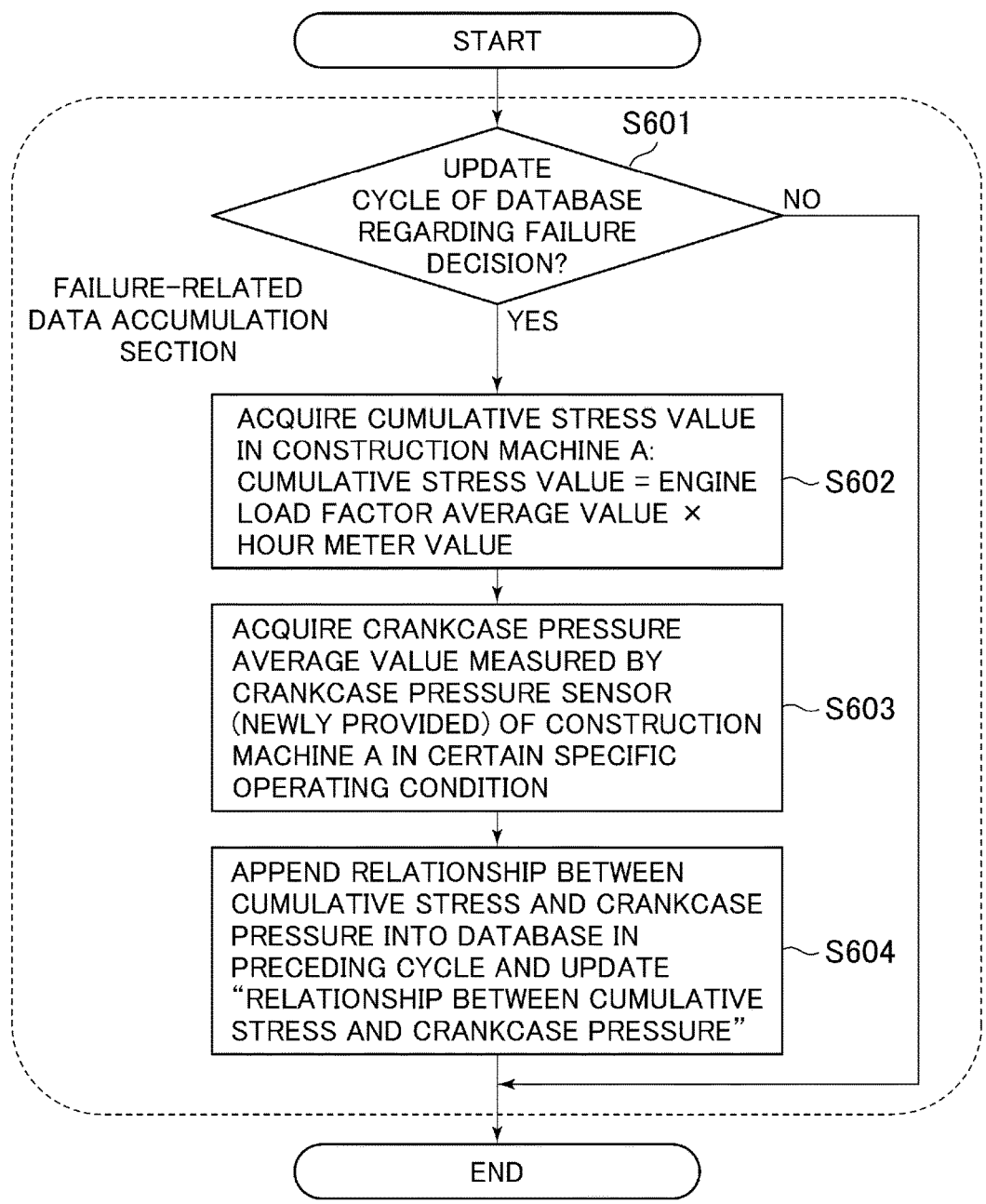
FIG. 10 is a diagram showing a processing flow in the airtightness degradation diagnosis process and is a diagram illustrating an updating flow of a database included in a failure-related data accumulation section 501 of a center server 105 has.

FIG. 10 is a diagram showing a process flow of the airtightness degradation diagnosis process and is a diagram showing an updating flow of a database that the failure-related data accumulation section 501 of the center server 105 has.

Referring to FIG. 10, the failure-related data accumulation section 501 of the center server 105 first decides whether or not a cycle determined in advance for updating a database regarding a failure decision is reached (step S601). If a result of the decision is YES, then the failure-related data accumulation section 501 acquires a cumulative stress value of the representative machine body (step S602), acquires an average value of the crankcase pressure under a particular operating condition determined in advance from the crankcase pressure sensor 308 provided newly in the representative machine body (step S603), updates the information regarding the relationship between the cumulative stress and the crankcase pressure in the database (step S604) and then ends the processing. On the other hand, if the decision result at step S601 is NO, then the processing is ended without updating the database.

Figure 11:
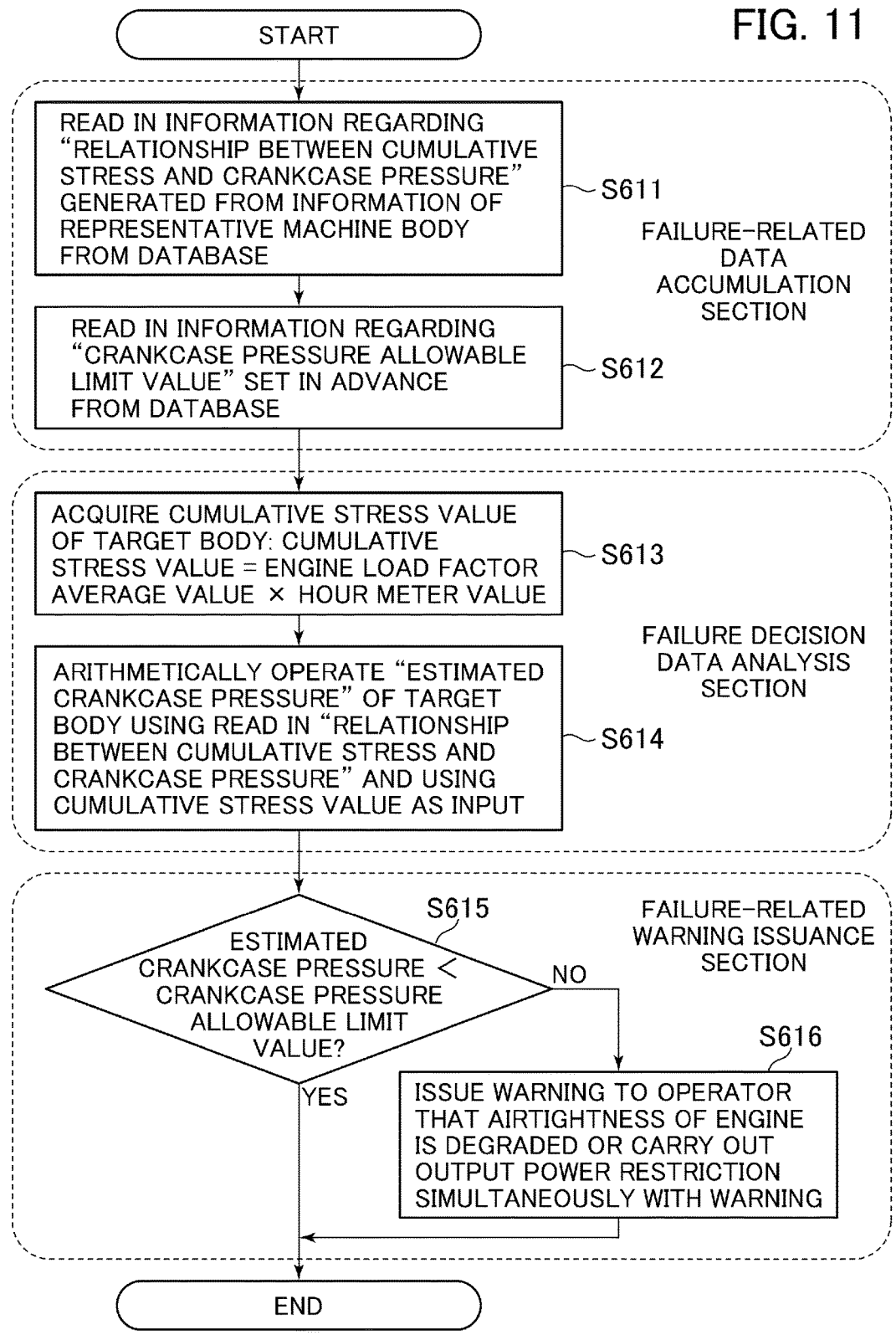
FIG. 11 is a diagram showing a processing flow in the airtightness degradation diagnosis process and is a diagram illustrating a decision flow of airtightness degradation in the airtightness degradation diagnosis process.

FIG. 11 is a diagram showing a processing flow in the airtightness degradation diagnosis process and is a diagram showing a decision flow of airtightness degradation in the airtightness degradation diagnosis process.

Referring to FIG. 11, the failure-related data accumulation section 501 of the center server 105 first reads out information regarding the relationship between the cumulative stress and the crankcase pressure generated from the information of the representative machine body from the database (step S611), and further reads out information regarding the crankcase pressure allowable limit value set in advance from the database (step S612). Then, the failure decision data analysis section 502 acquires the cumulative stress value of the machine body that is a processing target of the airtightness degradation diagnosis process (step S613), and estimates a crankcase pressure of the processing target of the airtightness degradation diagnosis process using the relationship between the cumulative stress and the crankcase pressure read out at steps S611 and S612 and the cumulative stress value acquired at step S613 to acquire the estimated crankcase pressure (step S614). Then, the failure-related warning issuance section 504 decides whether or not the estimated crankcase pressure is lower than the crankcase pressure allowable limit value (step S615). If a result of the decision is NO, then the failure-related warning issuance section 504 decides that the airtightness of the diesel engine 21 is in a degraded state and gives a warning of this to the operator through the display device or the like or carries out a process for output power restriction and so forth of the diesel engine 21 simultaneously with the warning (step S616). On the other hand, if the decision result at step S615 is YES, then the processing is ended immediately.

Working effects of the present embodiment configured in such a manner as described above are described.

To separately install a measuring sensor for collecting information to be used for a failure diagnosis of an engine like, for example, a cylinder internal pressure sensor in addition to various sensors installed normally for performing operation control of the machine body of a construction as in the case of the conventional technology gives rise to a subject that it leads to increase in the cost of the machine body. Meanwhile, a system that uses an information network has a subject in that, since there is a limitation to the communication capacity between a server that accumulates information and the machine body, in a case where sensors having a great information amount are attached to individual machine bodies, sufficient information from all machine bodies cannot be fetched.

In contrast, in the present embodiment, the construction machine management system manages a state of each of machine bodies in a machine body group of construction machines by a center server 105, the machine group including at least one representative machine body (first machine body) having an engine control unit 104 (first information detection device) that detects cumulative stress (first information) relating to the machine body of the construction machine and a crankcase pressure sensor 308 (second information detection device) that detects a crankcase pressure (second information), and at least one general machine body (second machine body) that has an engine control unit 104 but does not have a crankcase pressure sensor 308. In addition, the construction machine management system is configured such that it performs an airtightness degradation diagnosis process for performing a diagnosis of an omen of a failure state regarding the airtightness of the crankcase pressure of the general machine body on the basis of a correlation between the cumulative stress and the crankcase pressure obtained from the representative machine body and the cumulative stress of the general machine body. Therefore, a failure analysis or a failure-omen diagnosis relating to the airtightness of the diesel engine 21 of the machine body can be performed with a high degree of accuracy and at a low cost.

In particular, by placing the representative machine body, in which a sensor is additionally provided to increase the failure analysis capability, into an operating state precedently and by expanding information relating to a failure analysis obtained in the operation to the other general machine body, the failure handling ability of the entire machine body group can be improved.

Second Embodiment

A second embodiment of the present invention is described with reference to FIGS. 12 to 15.

Although the first embodiment described above is directed to a case in which an airtightness degradation diagnosis process is performed as a failure diagnosis relating to the airtightness of a diesel engine, the present embodiment described below is directed to another case in which an overload diagnosis process is performed for failure prevention relating to an overload on a diesel engine. In the figures of the present embodiment, like members and processes to those in the first embodiment are denoted by like reference characters and description of them is omitted herein.

The construction machine management system according to the present embodiment manages a state of each of machine bodies in a machine body group of construction machines, the machine body group including at least one representative machine body (first machine body) having a supercharging pressure sensor 307 (first information detection device) that detects a supercharging pressure (first information) relating to the machine body of the construction machine and a cylinder internal pressure sensor 309 (second information detection device) that detects a cylinder internal pressure (second information), and at least one general machine body (second machine body) that has a supercharging pressure sensor 307 (first information detection device) but does not have a cylinder internal pressure sensor 309 (second information detection device). The construction machine management system further performs, by a center server 105 (machine body state diagnosis apparatus), a diagnosis of an omen of a failure state regarding the cylinder internal pressure (second information) of the general machine body (second machine body) on the basis of correlation information between the supercharging pressure (first information) and the cylinder internal pressure (second information) obtained from the representative machine body (first machine body) and the supercharging pressure (first information) of the general machine body (second machine body).

Figure 12:
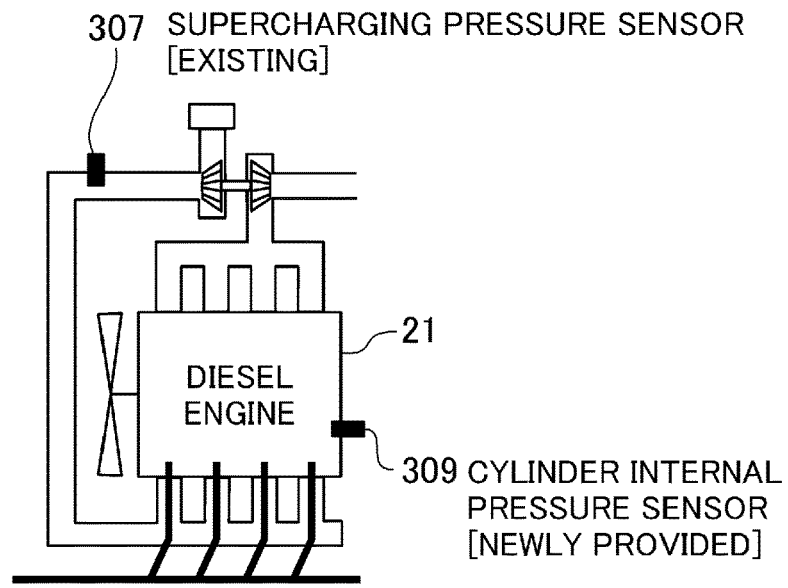
FIG. 12 is a diagram schematically illustrating a principle of an overload diagnosis in an overload decision process that is a failure-omen diagnosis regarding an overload on a diesel engine.
Figure 13:
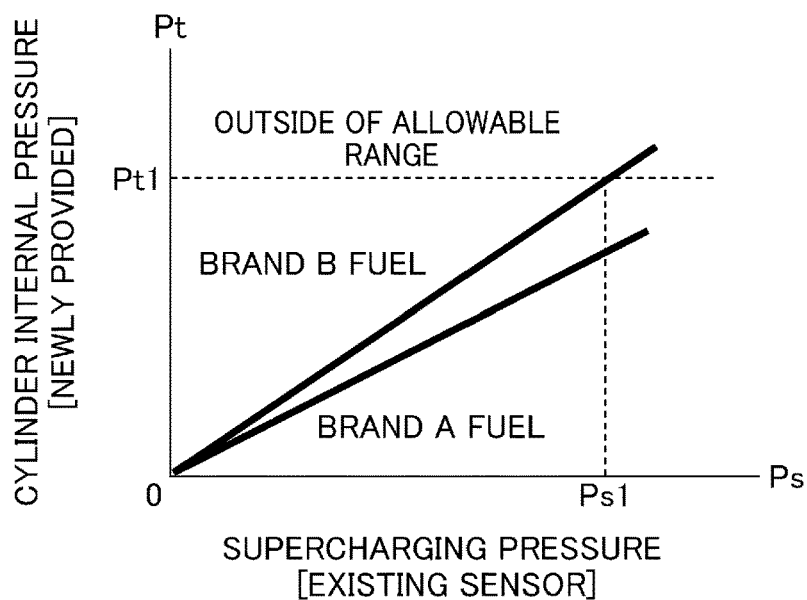
FIG. 13 is a diagram illustrating a correlation of parameters relating to an overload diagnosis process.
Figure 14:
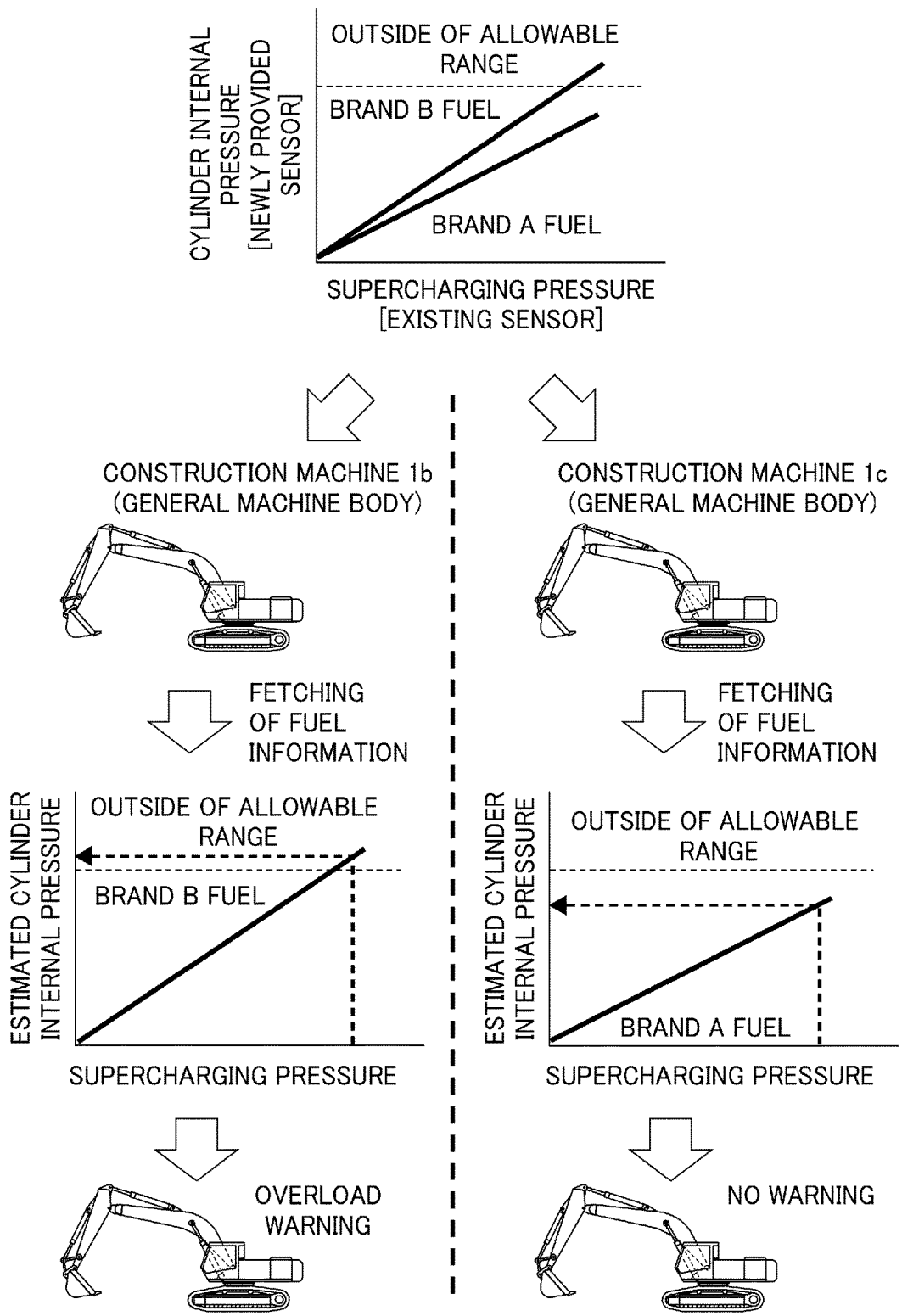
FIG. 14 is a diagram schematically illustrating a decision method of an overload in the overload diagnosis process.

FIG. 12 is a diagram schematically illustrating a principle of an overload diagnosis in an overload diagnosis process that is a failure-omen diagnosis relating to an overload on a diesel engine. FIG. 13 is a diagram illustrating a correlation between parameters relating to the overload diagnosis process. FIG. 14 is a diagram schematically showing a decision method of an overload in the overload diagnosis process.

FIG. 12 schematically shows the diesel engine 21 together with peripheral components thereof. The cylinder internal pressure (combustion pressure) of the diesel engine 21 is a representative index of stress given to the diesel engine 21, and from a point of view of engine protection, a margin is provided to adjust the output power of the diesel engine 21 such that the cylinder internal pressure does not become excessively high.

In the present embodiment, the engine output power is managed using a supercharging pressure, a fuel injection amount or the like having a fixed correlation with the cylinder internal pressure, as an alternative parameter. Since the relationship of the supercharging pressure or the fuel injection amount with the cylinder internal pressure is sometimes deviated by the quality of the fuel, the intake air temperature or the like, the representative machine body that precedes in operation is newly and additionally provided with a cylinder internal pressure sensor 309 in addition to the existing supercharging pressure sensor 307, and while a relationship between a detection value of the supercharging pressure sensor 307 and a detection value of the cylinder internal pressure sensor 309 (correlation between the supercharging pressure and the cylinder internal pressure) is plotted for each operating condition (for example, each of the brands A and B of the fuel) within the preceding operation period, the information of the relationship is stored into a database in the center server 105. Consequently, in the present embodiment, even if the relationship between the detection value of the supercharging pressure sensor 307 and the detection value of the cylinder internal pressure sensor 309 is varied by the quality of the fuel, the intake air temperature or the like, since the information of the variation factor is stored supplementarily into the database, it is possible to more accurately perform an overload diagnosis that is performed by estimating a degree of the overload on the diesel engine 21 under a wide range of conditions to perform a diagnosis of an omen of a failure state on the basis of the detection value of the existing supercharging pressure sensor 307.

FIG. 13 illustrates a relationship between the supercharging pressure and the cylinder internal pressure of the diesel engine of the representative machine body for each brand of the fuel, and the axis of ordinate indicates the cylinder internal pressure and the axis of abscissa indicates the supercharging pressure.

As illustrated in FIG. 13, where the fuel of the brand B is used, when the supercharging pressure Ps is 0, the cylinder internal pressure Pt is 0, and as the supercharging pressure Ps increases, also the cylinder internal pressure Pt increases. If the supercharging pressure Ps becomes a certain value Ps1, then the cylinder internal pressure Pt reaches an allowable limit value Pt1 (cylinder internal pressure allowable limit value) as a normal value of the cylinder internal pressure Pt, and if the supercharging pressure Ps exceeds the value Ps1, then the cylinder internal pressure Pt reaches the outside of the allowable range. On the other hand, where the fuel of the brand A is used, when the supercharging pressure Ps is 0, the cylinder internal pressure Pt is 0, and as the supercharging pressure Ps increases, also the cylinder internal pressure Pt increases. Then, even if the supercharging pressure Ps becomes the certain value Ps1, the cylinder internal pressure Pt does not reach the allowable limit value Pt1 (cylinder internal pressure allowable limit value), and even if the supercharging pressure Ps exceeds the value Ps1, the cylinder internal pressure Pt does not reach the outside of the allowable range.

As illustrated in FIG. 14, in a decision of an overload in the overload diagnosis process, information relating to an overload diagnosis (correlation between the supercharging pressure and the cylinder internal pressure) obtained on the representative machine body (refer to the construction machine 1a) is expanded to the other general machine bodies (construction machines 1b and 1c). The correlation between the supercharging pressure and the cylinder internal pressure acquired from the representative machine body is applied to the other general machine bodies through the center server 105 such that the overload diagnosis process of the diesel engine 21 is carried out.

For example, when an overload diagnosis process of a certain general machine body (construction machine 1b) is to be carried out, information relating to the supercharging pressure of the construction machine 1b is fetched into the center server 105 on the basis of an operation condition of the construction machine 1b (for example, where the fuel is of the brand B), and an estimated value of the cylinder internal pressure is arithmetically operated on the basis of the relationship between the supercharging pressure and the cylinder internal pressure. If it is decided as a result of the arithmetic operation that the estimated cylinder internal pressure is outside the allowable range, then a warning (overload warning) regarding the overload is issued from the center server 105 to the construction machine 1b such that the warning is displayed on the monitor unit (display device) 103 or the like to urge the operator to perform output power suppression.

Also when an overload diagnosis process for a different general machine body (construction machine 1c) is to be carried out, information relating to the supercharging pressure of the construction machine 1c is fetched into the center server 105 on the basis of an operation condition of the construction machine 1c (for example, where the fuel is of the brand A), and an estimated value of the cylinder internal pressure is arithmetically operated on the basis of the relationship between the supercharging pressure and the cylinder internal pressure similarly. If it is decided as a result of the arithmetic operation that the estimated cylinder internal pressure is within the allowable range, then the center server 105 makes no action and ends the processing of the overload diagnosis process.

Now, an overload diagnosis process in the present embodiment is described.

Figure 15:
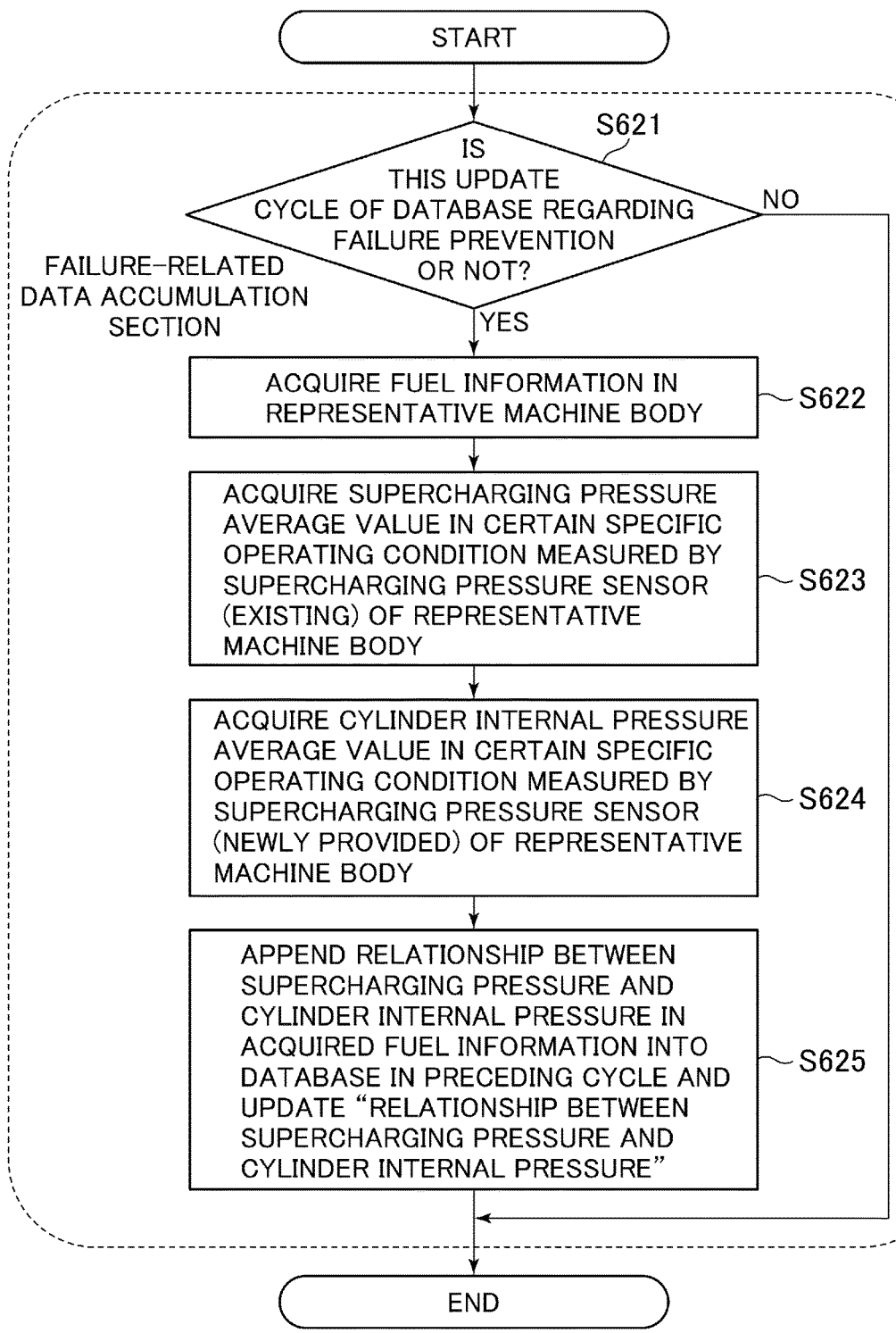
FIG. 15 is a diagram showing a processing flow in the overflow diagnosis process and is a diagram illustrating an updating flow of a database included in the failure-related data accumulation section 501 of the center server 105.

FIG. 15 is a diagram showing a processing flow in the overload diagnosis process and is a diagram showing an updating flow of a database that the failure-related data accumulation section 501 of the center server 105 has.

Referring to FIG. 15, the failure-related data accumulation section 501 of the center server 105 first decides whether or not a cycle determined in advance for updating the database regarding failure prevention is reached (step S621). If a result of the decision is YES, then the failure-related data accumulation section 501 acquires fuel information of the representative machine body (information of the brand of the fuel and so forth) (step S622), acquires an average value of the supercharging pressure under a predetermined certain operation condition of the representative machine body using the supercharging pressure sensor 307 provided already in the representative machine body (step S623), acquires an average value of the cylinder internal pressure under the predetermined certain operation condition using the cylinder internal pressure sensor 309 provided newly in the representative machine body (step S624), updates the information regarding the relationship between the supercharging pressure and the cylinder internal pressure in the database (step S625), and then ends the processing. On the other hand, if the decision result at step S621 is NO, then the failure-related data accumulation section 501 ends the processing without updating the database.

Figure 16:
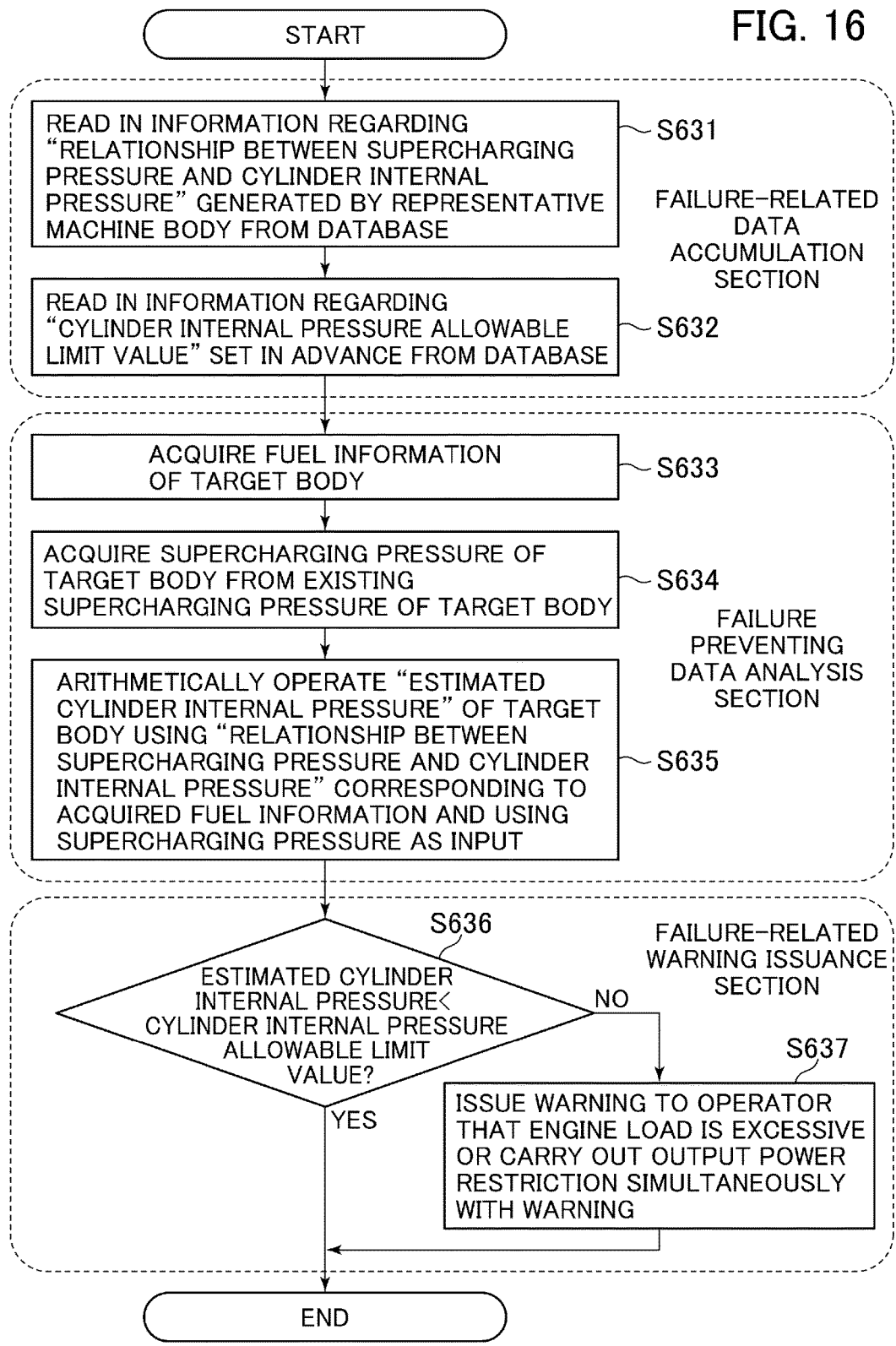
FIG. 16 is a diagram illustrating a processing flow in the overload diagnosis process and is a diagram illustrating a decision flow of an overload in the overload diagnosis process.

FIG. 16 is a diagram illustrating a processing flow in the overload diagnosis process and is a diagram showing a decision flow of an overload in the overload diagnosis process.

Referring to FIG. 16, the failure-related data accumulation section 501 of the center server 105 first reads out the information regarding the relationship between the supercharging pressure and the cylinder internal pressure generated from the information of the representative machine body from the database (step S631) and further reads out the information regarding the cylinder internal pressure allowable limit value set in advance from the database (step S632). Then, the failure preventing data analysis section 503 acquires fuel information of a machine body that is to be made a target of processing of the overload diagnosis process (step S633) and acquires an overcharging pressure (step S634). Then, the failure preventing data analysis section 503 uses that one of the relationships between the supercharging pressure and the cylinder internal pressure read out at steps S631 and S632, the one of the relationships corresponding to the fuel information acquired in step S633, and the supercharging pressure acquired at step S613 to estimate the cylinder internal pressure of the processing target machine body of the overload diagnosis process to acquire the estimated cylinder internal pressure (step S635). Then, the failure-related warning issuance section 504 decides whether or not the estimated cylinder internal pressure is lower than the cylinder internal pressure allowable limit value (step S636). If a result of the decision is NO, then the failure-related warning issuance section 504 decides that the load on the diesel engine 21 is excessively high and gives a warning of this to the operator through the display device or the like or carries out a process such as output power restriction of the diesel engine 21 simultaneously with such warning (step S637). On the other hand, if the decision result at step S636 is YES, then the processing is ended immediately.

The configuration of the other part is similar to that of the first embodiment.

Also with the present embodiment configured in such a manner as described above, similar advantageous effects to those of the first embodiment can be achieved.

Third Embodiment

A third embodiment of the present invention is described with reference to FIGS. 17 to 19.

While the second embodiment described above is directed to a case in which an overload diagnosis process is performed in order to prevent a failure relating to an overload on a diesel engine, the present embodiment described below is directed to another case in which an over rotation diagnosis process is performed in order to prevent a failure relating to an over rotation of a supercharger. In the figures of the present embodiment, like members and processes to those in the first and second embodiments are denoted by like reference characters and description of them is omitted herein.

The construction machine management system according to the present embodiment manages a state of each of machine bodies in a machine body group of construction machines, the machine body group including at least one representative machine body (first machine body) having a supercharging pressure sensor 307 (first information detection device) that detects a supercharging pressure (first information) relating to the machine body of the construction machine and a turbine speed sensor 310 (second information detection device) that detects a turbine speed (second information), and at least one general machine body (second machine body) that has a supercharging pressure sensor 307 (first information detection device) but does not have a turbine speed sensor 310 (second information detection device). The construction machine management system further performs, by a center server 105 (machine body state diagnosis apparatus), a diagnosis of an omen of a failure state regarding the turbine speed (second information) of the general machine body (second machine body) on the basis of correlation information between the supercharging pressure (first information) and the turbine speed (second information) obtained from the representative machine body (first machine body) and the supercharging pressure (first information) of the general machine body (second machine body).

Figure 17:
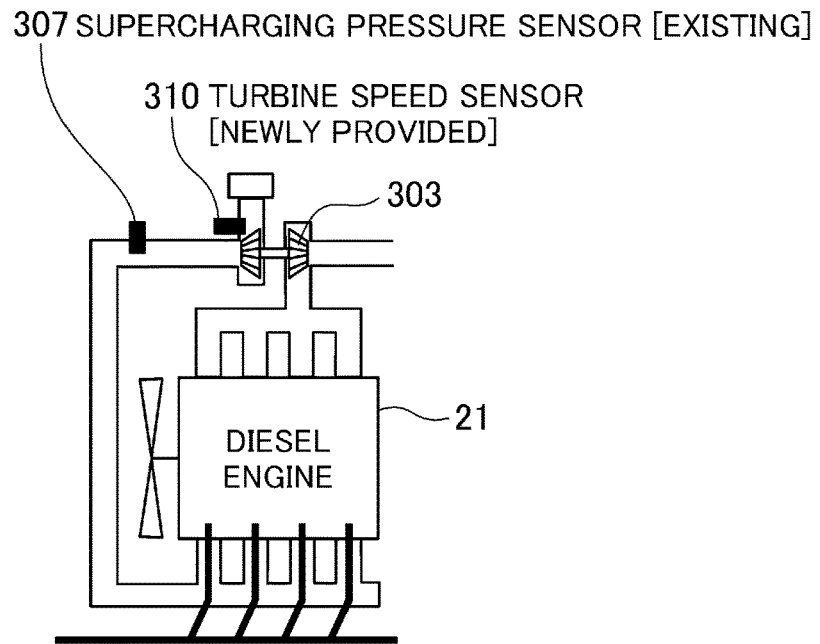
FIG. 17 is a diagram schematically illustrating a principle of an over rotation diagnosis in an over rotation decision process that is a failure-omen diagnosis relating to an over rotation of a supercharger of a diesel engine.

FIG. 17 is a diagram schematically illustrating a principle of an over rotation diagnosis in an over rotation diagnosis process that is a failure-omen diagnosis relating to an over rotation of a supercharger of a diesel engine. FIG. 18 is a diagram illustrating a correlation between parameters relating to the over rotation diagnosis process. FIG. 19 is a diagram schematically showing a decision method of an over rotation in the overload diagnosis process.

Referring to FIG. 17, the diesel engine 21 and the turbocharger 303 are schematically shown together with peripheral components of them. Although the supercharging pressure in the supercharger depends upon the turbine speed, in a work on such a highland as shown in FIG. 3, since the density of air to be taken in is low, the supercharging pressure is lower than that on a flatland when this is compared in the same turbine speed. Accordingly, in order to obtain an equal supercharging pressure to that on a flatland, it is necessary to further increase the turbine speed. In short, if an engine is driven without decreasing a target supercharging pressure, for example, on a highland, then there is the possibility that the turbine speed may increase until an unreasonable load is applied to the supercharger. Therefore, it is necessary to control the upper limit to the speed of the turbine.

In the present embodiment, the turbine speed is managed using the supercharging pressure or the like having a fixed correlation with the turbine speed as an alternative parameter. Since the relationship of the supercharging pressure with the turbine speed may not be decided uniformly depending upon the environment or a time-dependent variation of the supercharger, the representative machine body that precedes in operation is newly and additionally provided with a turbine speed sensor 310 in addition to the existing supercharging pressure sensor 307, and while a relationship between a detection value of the supercharging pressure sensor 307 and a detection value of the turbine speed sensor 310 (correlation between the supercharging pressure and the turbine speed) is plotted for each operating condition (for example, a flatland or a highland) within the preceding operation period, the information of the relationship is stored into a database in the center server 105. Consequently, in the present embodiment, even when the relationship between the detection value of the supercharging pressure sensor 307 and the detection value of the turbine speed sensor 310 is varied by the operation environment, a time-dependent variation of the supercharger or the like, since the information of the variation factor is stored supplementarily into the database, it is possible to more accurately perform an over rotation diagnosis. The over rotation diagnosis is performed by estimating a degree of the over rotation under a wide range of conditions and performing a diagnosis of an omen of a failure state on the basis of the detection value of the existing supercharging pressure sensor 307.

Figure 18:
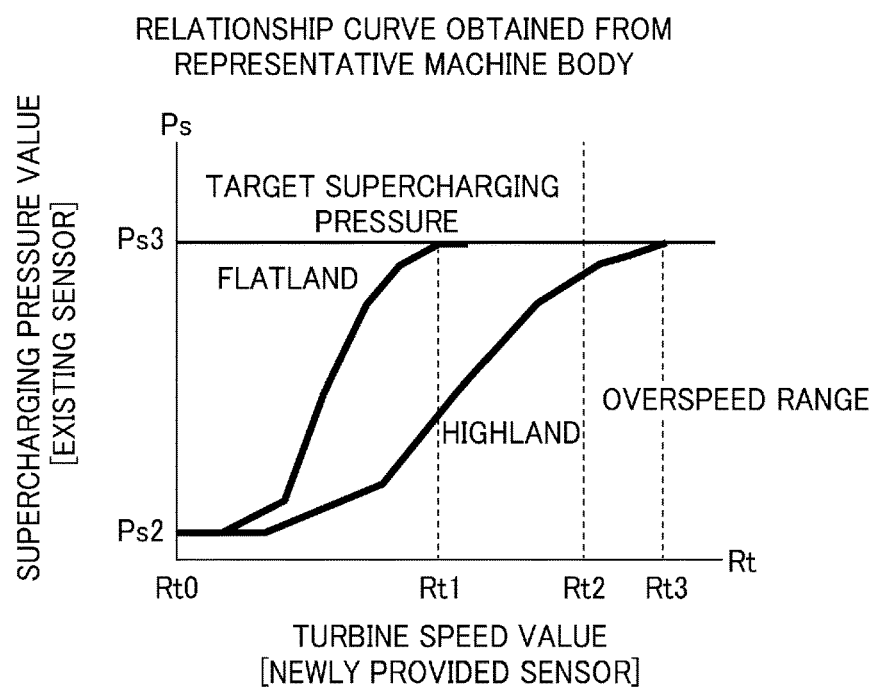
FIG. 18 is a diagram illustrating a correlation of parameters relating to an over rotation diagnosis process.

As shown in FIG. 18, where the operation environment of the machine body is a flatland, if the turbine speed Rt is Rt0, the supercharging pressure Ps is Ps2, and as the turbine speed Rt increases, also the supercharging pressure Ps increases. Then, if the turbine speed Rt becomes a certain value Rt1 (Rt1<turbine speed allowable value limit Rt2), the supercharging pressure Ps reaches a target supercharging pressure Ps3. On the other hand, where the operation environment of the machine body is a highland, if the turbine speed Rt is Rt0, then the supercharging pressure Ps is Ps2, and as the turbine speed Rt increases, also the supercharging pressure Ps increases. Also if the turbine speed Rt becomes the turbine speed allowable value limit Rt2, the supercharging pressure Ps does not reach the target supercharging pressure Ps3, and if the turbine speed Rt becomes the certain value Rt3 (Rt3>turbine speed allowable value limit Rt2), the supercharging pressure Ps reaches the target supercharging pressure Ps3.

Figure 19:
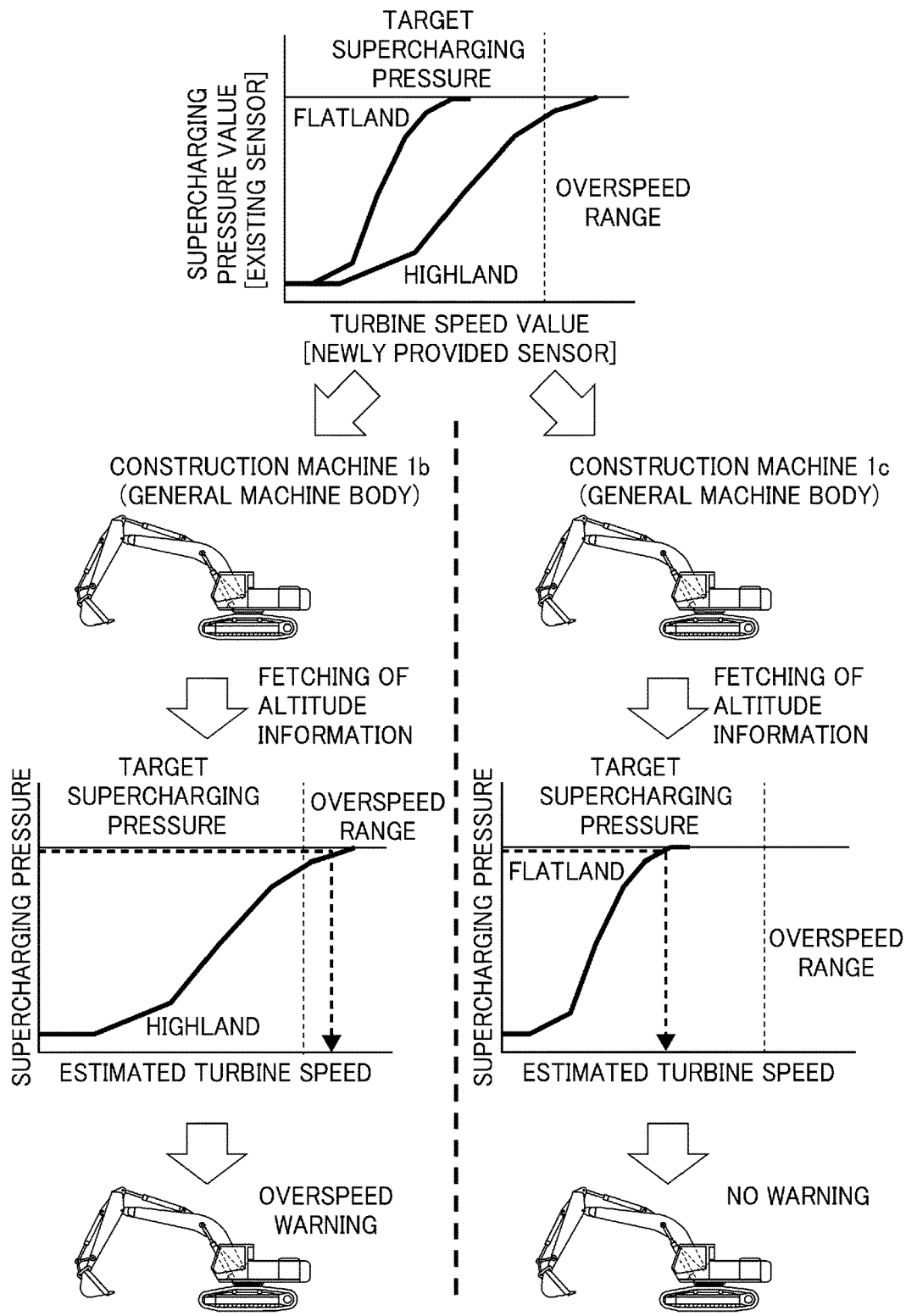
FIG. 19 is a diagram schematically illustrating a decision method of an over rotation in the over rotation diagnosis process.

As shown in FIG. 19, in a decision of an over rotation in the over rotation diagnosis process, information regarding an over rotation diagnosis (correlation between the supercharging pressure and the turbine speed) obtained from the representative machine body (refer to the construction machine 1a) is expanded to the other general machine body (construction machines 1b and 1c). The correlation between the supercharging pressure and the turbine speed acquired from the representative machine body is applied to the other general machine bodies through the center server 105 to carry out an over rotation diagnosis process of the turbine of the supercharger of the diesel engine 21.

For example, when the over rotation diagnosis process for a certain general machine body (construction machine 1b) is to be performed, information regarding the supercharging pressure of the construction machine 1b is fetched into the center server 105 on the basis of the operation environment of the construction machine 1b (for example, when the operation environment is a highland), and an estimated value of the turbine speed is arithmetically operated on the basis of the relationship between the supercharging pressure and the turbine speed. If it is decided as a result of the arithmetic operation that the estimated turbine speed is outside the allowable range, then a warning (over rotation warning) regarding an over rotation is issued from the center server 105 to the construction machine 1b such that the warning is displayed on the monitor unit (display device) 103 or the like to urge the operator to suppress the output power.

Also when an over rotation diagnosis process for any other general machine body (construction machine 1c) is performed, information regarding the supercharging pressure of the construction machine 1c is fetched into the center server 105 on the basis of an operation condition of the construction machine 1c (for example, where the operation environment is a flatland), and an estimated value of the turbine speed is arithmetically operated on the basis of the relationship between the supercharging pressure and the turbine speed. If it is decided as a result of the arithmetic operation that the estimated turbine speed is inside the allowable range, then the center server 105 makes no action and ends the processing of the over rotation diagnosis process.

The configuration of the other part is similar to that in the first and second embodiments.

Also with the present embodiment configured in such a manner as described above, similar advantageous effects to those by the first and second embodiments can be achieved.

As described in connection with the first to third embodiments, in the construction machine management system according to the present invention, a representative machine body is selected from within a machine group connecting to an information network, and the representative machine body is newly and additionally provided with a measuring sensor to enhance a failure analysis capability or an omen diagnostic ability and is placed into operation preceding the operation of the other general machine body. Consequently, the representative machine body plays a role of a probe that collects information relating to a failure in an actual environment/actual work, and by sharing the information with the other general machine bodies through the information network, the failure handling ability not only of the representative machine body but of the entire machine body group connecting to the same network can be improved. Further, since the new and additional provision of the measuring sensor is restricted to the representative machine body, increase in the cost of the entire construction machine management system and increase in the network load can be reduced.

It is to be noted that, while, in the first to third embodiments, a crankcase pressure sensor, a cylinder internal pressure sensor and a turbine speed sensor are indicated as the measuring sensors, the measuring sensors are not limited to them, and it is a matter of course that it is possible to apply other measuring sensors such as an engine torque sensor, a humidity sensor or various temperature sensors.

Further, while, in the first to third embodiments of the present invention, a representative machine body is newly and additionally provided with a measuring sensor in addition to an existing controlling sensor to enhance a failure analysis capability or an omen diagnostic ability, it is a possible idea to increase the number of types of information to be transmitted to the center server 105 in comparison with the other general machine bodies or to reduce the interval between information transmissions in comparison with that of the other general machine bodies in order to enhance the failure analysis capability of the representative machine body.

Further, while, in the first to third embodiments of the present invention described above, a diesel engine that is a prime mover of a construction machine is indicated as a target of a failure analysis, the target of a failure diagnosis is not limited to this, and also it is possible to apply the present invention, for example, to a diagnosis for a hydraulic system or a structure of a construction machine.

DESCRIPTION OF REFERENCE CHARACTERS

1: Hydraulic excavator (construction machine)
1a: Construction machine (representative machine body)
1b, 1c: Construction machine (general machine body)
101: Main control unit (information detection device)
102: Information control unit (information network)
103: Monitor unit (display device)
104: Engine control unit (information detection device)
105: Center server (machine body state diagnosis apparatus)
107: Satellite communication (information network)
306: Rotational speed sensor (information detection device)
307: Supercharging pressure sensor (information detection device)
308: Crankcase pressure sensor (information detection device)
404: Exhaust gas temperature sensor (information detection device)
405: DPF pressure difference sensor (information detection device)
501: Failure-related data accumulation section (machine body state diagnosis device)
502: Failure decision data analysis section (machine body state diagnosis device)
503: Failure preventing data analysis section (machine body state diagnosis device)
504: Failure-related warning issuance section (machine body state diagnosis device)

The invention claimed is:

1. A construction machine management system comprising:
a server that manages states of a plurality of construction machines, the construction machines including at least one first construction machine having a respective engine and at least one second construction machine having a respective engine;
a first information detection device that detects first information that is either a cumulative stress that is calculated by multiplying an average value of an engine load factor and a cumulative value of an operating time of the respective engine disposed therewith, or a supercharging pressure for a turbocharger of the respective engine disposed therewith; and
a second information detection device that detects second information that is either an internal pressure of a crankcase of a respective engine disposed therewith, a cylinder internal pressure of the respective engine disposed therewith, or a turbine speed of a turbocharger of the respective engine disposed therewith,
wherein the first information detection device is an engine control unit that detects the cumulative stress or a supercharging pressure sensor that detects the supercharging pressure for the turbocharger of the respective engine disposed therewith, and
wherein the second information detection device is a crankcase pressure sensor that detects the internal pressure of the crankcase of the respective engine disposed therewith, a cylinder internal pressure sensor that detects the cylinder internal pressure of the respective engine disposed therewith, or a turbine speed sensor that detects the turbine speed of the turbocharger of the respective engine disposed therewith, and
wherein the first construction machine has the first information detection device and the second information detection device, and
wherein the second construction machine has the first information detection device and does not have the second information detection device, and
wherein the server is configured to obtain the first information and the second information of the first construction machine from the first construction machine and the second information of the second construction machine from the second construction machine, and perform a diagnosis of an omen of a failure state regarding a crankcase pressure, a cylinder internal pressure, or a turbine speed of the second construction machine based on correlation information between the first information and the second information obtained from the first construction machine and the first information of the second construction machine.

2. The construction machine management system according to claim 1, wherein
the first construction machine is higher in occupancy rate in comparison with the second construction machine.

3. The construction machine management system according to claim 1, wherein
the first construction machine and the second construction are a same model.

4. The construction machine management system according to claim 1, wherein
the first construction machine and the second machine construction are connected to a same information network.

5. The construction machine management system according to claim 1, wherein
the first construction machine and the second construction machine are grouped based on one of an operation environment, a work load, and a work type of the construction machine.

6. The construction machine management system according to claim 1, wherein the first construction machine is a construction machine that sends a greater number of types of information than that of the second construction machine to the server.

7. The construction machine management system according to claim 1, wherein
information is transmitted to the server in a shorter cycle from the first construction machine with respect to the second construction machine.

8. The construction machine management system according to claim 1, wherein,
when the server diagnoses that the second construction body is in the failure state or diagnoses the omen of a failure state indicating the possibility that the second machine body may fail is high, the server is further configured to display contents of the diagnosis on a display device or perform output power restriction of a prime mover of the second construction machine based on the contents of the diagnosis.

* * * * *